United States Patent Office 2,902,398
Patented Sept. 1, 1959

2,902,398

PROCESS FOR TREATING FIBROUS MATERIALS TO IMPROVE ADHESION TO RUBBER AND RESULTING PRODUCTS

Carl W. Schroeder, Orinda, Calif., assignor to Shell Development Company, New York, N.Y., a corporation of Delaware No Drawing. Application June 18, 1956
Serial No. 591,784

12 Claims. (Cl. 154—139)

This invention relates to the treatment of fibrous material. More particularly, the invention relates to a method for treating fibrous textile material to improve their adhesion to rubber.

Specifically, the invention provides a new process for treating fibrous textile materials, and preferably synthetic fibrous materials, such as, for example, rayon and nylon tire cord, to improve their ability to adhere to rubber which comprises treating the fibrous material with an aqueous medium containing a polyepoxide having an epoxy equivalency per 100 grams greater than 0.20, and an epoxy curing agent, drying the material and then treating the dried material with a liquid medium containing a rubber and preferably a rubber and a fusible condensate of an aldehyde and a member of the group consisting of phenols, ureas, melamines and ketones. The invention further provides a process for utilizing these treated fibrous materials in the preparation of reinforced rubber products.

In the manufacture of certain rubber goods, such as tires, transmission belts and conveyor belts, which are subjected to severe service conditions, it has been found desirable to incorporate fibrous material, such as cord, fabrics, etc. with the rubber in order to give added strength to withstand the severe service. One of the main disadvantages to the use of the fibrous materials, and particularly the synthetic materials, such as those of rayon and nylon, in this application, however, is the fact that most of the fibrous materials have poor adhesion to rubber and will separate from the rubber when the product is subjected to loads. This causes increased heat generation, propagation of tears, and general breakdown of the product. The problem of adhesion is particularly important in the manufacture of the tubeless tires wherein poor adhesion to the tire cord tends to permit air leakage.

It is an object of the invention, therefore, to provide a new process for treating fibrous material. More particularly, the invention relates to a new process for treating fibrous material to improve its adhesion to rubber. It is a further object to provide a new process for improving adhesion between rubber and tire cords, fabrics and the like, and thereby giving reinforced rubber products having better strength and resistance to wear. It is a further object to provide a new and improved method for improving adhesion of rubbers to nylon and rayon tire cord. It is a further object to provide a method for treating synthetic tire cord to give products that are particularly suited for use in preparing tubeless tires. It is a further object to provide new and improved reinforced rubber products. Other objects and advantages of the invention will be apparent from the following detailed description thereof.

It has now been discovered that these and other objects may be accomplished by the process of the invention which comprises treating the fibrous textile material with an aqueous medium containing a polyepoxide having an epoxy equivalency per 100 grams greater than 0.20, and an epoxy curing agent, drying the materials and then treating the dried material with a liquid medium containing rubber and preferably a rubber and a fusible condensate of an aldehyde and a member of the group consisting of phenols, ureas, malamines and ketones. It has been found that when fibrous material is treated in this manner and then combined with rubber stock and subsequently vulcanized, the resulting composite product shows outstanding adhesion between the fibrous material and the rubber. For example, rubber products prepared from nylon tire cord treated according to the process of the invention has an adhesion value of the order of 28 to 32 compared to a value of about 15.4 for cord treated in the conventional manner. Furthermore, the products prepared in this manner undergo no marked decrease in fatigue resistance, i.e., loss of adhesion after exposure to drastic flexing and stretching at elevated temperature. This latter property is of particular advantage in articles, such as tires, fan belts, etc., which must withstand higher temperatures, and severe flexing and bending.

The fibrous materials treated according to the present invention are particularly suited for use in preparing products, such as tubeless tires, because the superior adhesion reduces the possibility of air leakage.

The material used in the first treatment of the fibrous material comprises an aqueous medium containing a certain type of polyepoxide and an epoxy curing agent. The polyepoxide used in the preparation of this aqueous medium may be any material having more than one epoxy group, i.e., more than one

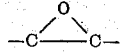

group, an epoxy equivalency per 100 grams greater than 0.20 as determined by standard analysis, and preferably a molecular weight below 900. These polyepoxides may be saturated or unsaturated and aliphatic, cycloaliphatic and aromatic and may be substituted with substituents, such as chlorine atoms, hydroxyl groups, alkoxy radicals and the like.

Examples of these polyepoxides include, among others, vinyl cyclohexene dioxide, 2,3,5,6-diepoxyoctane, 2,3,6,7-diepoxydodecane, 1,2-epoxy-3-(2,3-epoxypropyl) cyclohexane, 1,2-epoxy-4-(3,4-epoxybutyl) cyclohexane, epoxidized triglycerides as epoxidized glycerol trioleate and epoxidized glycerol trilinoleate, the monoacetate of epoxidized glycerol dioleate and the like.

Other polyepoxides comprise the polyepoxy polyethers obtained by reacting, preferably in the presence of an acid-acting compound, such as hydrofluoric acid, one of the aforedescribed halogen-containing epoxides with a polyhydric alcohol, and subsequently treating the resulting product with an alkaline component. As used herein and in the claims, the expression "polyhydric alcohol" is meant to include those compounds having at least two free alcoholic OH groups and includes the polyhydric alcohols and their ethers and esters, hydroxy-aldehydes, hydroxy-ketones, halogenated polyhydric alcohols and the like. Polyhydric alcohols that may be used for this purpose may be exemplified by glycerol, propylene glycol, ethylene glycol, diethylene glycol, butylene glycol, hexanetriol, sorbitol, mannitol, pentaerythritol, polyallyl alcohol, polyvinyl alcohol, inositol, trimethylolpropane, bis(4-hydroxycyclohexyl) dimethylmethane, 1,4 - dimethylolbenzene, 4,4'-dimethyloldiphenyl, dimethyloltoluenes, and the like. The polyhydric ether alcohols include, among others, diglycerol, triglycerol, dipentaerythritol, tripentanerythritol, dimethylolanisoles, beta-hydroxyethyl ethers of polyhydric alcohols, such as diethylene glycol, polyethylene glycols, bis(beta-hydroxyethyl ether) of hydroquinone, bis(beta-hydroxyethyl ether) of bis-phenol, beta-hydroxyethyl ethers of glycerol, pentaerythritol, sorbitol, mannitol, etc., condensates of alkylene oxides, such as ethylene oxide, propylene oxide, butylene oxide, isobutylene oxide, glycidyl, epichlorohydrin, glycidyl ethers, etc., with polyhydric alcohols, such as the foregoing and with polyhydric thioethers, such as 2,2'-dihydroxy diethyl sulfide, 2,2'-3,3'-tetrahydroxy dipropyl sulfide, etc. The hydroxy-aldehydes and ketones may be exemplified by dextrose, fructose, maltose, glyceraldehyde. The mercapto (thio) alcohols may be exemplified by alpha-monothioglycerol, alpha, alpha-dithioglycerol, etc. The polyhydric alcohol esters may be exemplified by monoglycerides, such as monostearin, monoesters of pentaerythritol and acetic acid, butyric acid, pentanoic acid, and the like. The halogenated polyhydric alcohols may be exemplified by the monochloride of pentaerythritol, monochloride of sorbitol, monochloride of mannitol, monochloride of glycerol, and the like.

Coming under special consideration are the polyglycidyl polyethers of polyhydric alcohols obtained by reacting the polyhydric alcohol with epichlorohydrin, preferably in the presence of 0.1% to 5% by weight of an acid-acting compound, such as boron trifluoride, hydrofluoric acid, stannic chloride or stannic acid. This reaction is effected at about 50° C. to 125° C. with the proportions of reactants being such that there is about one mole of epichlorohydrin for every equivalent of hydroxyl group in the polyhydric alcohol. The resulting chlorohydrin ether is then dehydrochlorinated by heating at about 50° C. to 125° C. with a small, e.g., 10% stoichiometrical excess of a base, such as sodium aluminate.

The products obtained by the method shown in the preceding paragraph may be described as polyether polyepoxide reaction products which in general contain at least three non-cyclic ether (—O—) linkages, terminal epoxide-containing ether

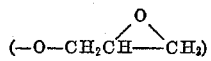

groups and halogen attached to a carbon of an intermediate

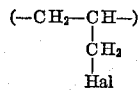

group.

These halogen-containing polyether polyepoxide reaction products obtainable by partial dehydrohalogenation of polyhalohydrin alcohols may be considered to have the following general formula

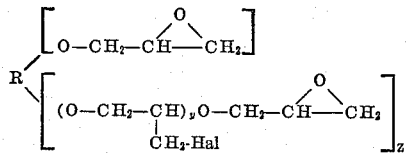

in which R is the residue of the polyhydric alcohol which may contain unreacted hydroxyl group X indicates one or more of the epoxy ether groups attached to the alcohol residue, y may be one or may vary in different reaction products of the reaction mixture from zero to more than one, and Z is one or more, and $X+Z$, in the case of products derived from polyhydric alcohols containing three or more hydroxyl groups, averages around two or more so that the reaction product contains on the average two or more than two terminal epoxide groups per molecule.

The preparation of one of these preferred polyglycidyl ethers of polyhydric alcohols may be illustrated by the following example showing the preparation of a glycidyl polyether of glycerol.

PREPARATION OF GLYCIDYL POLYETHERS OF POLYHYDRIC ALCOHOLS

Polyether A

About 276 parts (3 moles) of glycerol was mixed with 832 parts (9 moles) of epichlorohydrin. To this reaction mixture was added 10 parts of diethyl ether solution containing about 4.5% boron trifluoride. The temperature of this mixture was between 50° C. and 75° C. for about 3 hours. About 370 parts of the resulting glycerol-epichlorohydrin condensate was dissolved in 900 parts of dioxane containing about 300 parts of sodium aluminate. While agitating, the reaction mixture was heated and refluxed at 93° C. for 9 hours. After cooling at atmospheric temperature, the insoluble material was filtered from the reaction mixture and low boiling substances removed by distillation to a temperature of about 150° C. at 20 mm. pressure. The polyglycidyl ether, in amount of 261 parts, was a pale yellow viscous liquid. It had an epoxide value of 0.671 equivalent per 100 grams and the molecular weight was 324 as measured ebullioscopically in dioxane solution. For convenience, this product will be referred to hereinafter as Polyether A.

Polyether B 10.5 moles of ethylene oxide was bubbled through 3.5 moles glycerine containing an acid catalyst at 40–50° C. The resulting product had a molecular weight of 224 and a hydroxyl value of 1.417 eq./100 g. 101 parts of this ethylene oxide glycerine condensate was placed in a reaction kettle and heated to 65–70° C. Sufficient $BF_3$-ethyl ether complex was added to bring the pH to about 1.0 and then 132 parts of epichlorohydrin added dropwise. After all the epi had been added, the reaction was continued for about 15 minutes to assure complete reaction. This product was then dissolved in benzene and 57 parts of sodium hydroxide were added in 7 equal portions at about 87–89° C. over a period of ¾ hour and then filtered to remove the salt. The solvent and light ends were then removed by stripping at a low vacuum. The resulting product had a molecular weight of 455, and an epoxy value of .524 eq./100 g. For convenience, this polyether will be referred to herein as Polyether B.

Particularly preferred members of this group comprise the glycidyl polyethers of aliphatic polyhydric alcohols containing from 2 to 10 carbon atoms and having from 2 to 6 hydroxyl groups and more preferably the alkane polyols containing from 2 to 8 carbon atoms and having from 2 to 6 hydroxyl groups. Such products preferably have an epoxy equivalency greater than 1.0, and still more preferably between 1.1 and 4 and a molecular weight between 300 and 1000.

Other examples include the epoxy polyethers of polyhydric phenols obtained by reacting a polyhydric phenol with a halogen containing epoxide or dihalohydrin in the presence of an alkaline medium. Polyhydric phenols that can be used for this purpose include among others resorcinol, catechol, hydroquinone, methyl resorcinol, or polynuclear phenols, such as 2,2-bis(4-hydroxyphenyl) propane (Bis-phenol A), 2,2-bis(4-hydroxyphenol butane), 4,4'-dihydroxybenzophenone, bis(4-hydroxyphenyl) ethane, 2,2 - bis(4 - hydroxyphenyl) pentane, and 1,5-dihydroxynaphthalene. The halogen-containing epoxides may be further exemplified by 3-chloro-1,2 - epoxybutane, 3-bromo - 1,2 - epoxyhexane, 3-chloro-1,2-epoxyoctane, and the like.

The aforedescribed glycidyl polyethers of the dihydric phenols may be prepared by reacting the required proportions of the dihydric phenol and the epichlorhydrin in an alkaline medium. The desired alkalinity is obtained by adding basic substances, such as sodium or potassium hydroxide, preferably in stoichiometric excess to the epichlorhydrin. The reaction is preferably accomplished at temperatures within the range of from 50° C. to 150° C. The heating is continued for several hours to effect the reaction and the product is then washed free of salt and base.

The preparation of some of the glycidyl polyethers of dihydric phenols will be illustrated below. Unless otherwise specified, parts indicated are parts by weight.

PREPARATION OF GLYCIDYL POLYETHERS OF DIHYDRIC PHENOLS

Polyether C

About 2 moles of 2,2-bis(4-hydroxyphenyl) propane was dissolved in 10 moles of epichlorohydrin and 1% to 2% water added to the resulting mixture. The mixture was then brought to 80° C. and 4 moles of solid sodium hydroxide added in small portions over a period of about 1 hour. During the addition, the temperature of the mixture was held at about 90° C. to 110° C. After the sodium hydroxide had been added, the water formed in the reaction and most of the epichlorohydrin was distilled off. The residue that remained was combined with an approximately equal quantity by weight of benzene and the mixture filtered to remove the salt. The benzene was then removed to yield a viscous liquid having a viscosity of about 150 poises at 25° C. and a molecular weight of about 350 (measured ebullioscopically in ethylene dichloride). The product had an epoxy value eq./100 g. of 0.50.

Another group of polyepoxides include the epoxy esters of polybasic acids, such as diglycidyl phthalate and diglycidyl adipate, diglycidyl tetrahydrophthalate, diglycidyl maleate, epoxidized dimethallyl phthalate and epoxidized dicrotyl phthalate.

Other polyepoxide compounds include the polymers and copolymers of the epoxy-containing monomers possessing at least one polymerizable ethylenic linkage, such as, for example, allyl glycidyl ether. When this type of monomer is polymerized in the substantial absence of alkaline or acidic catalysts, such as in the presence of heat, oxygen, peroxy compound, actinic light, and the like, they undergo additional polymerization at the multiple bond leaving the epoxy group unaffected. These monomers may be polymerized with themselves or with other ethylenically unsaturated monomers, such as styrene, vinyl acetate, methacrylonitrile, acrylonitrile, vinyl chloride, vinylidene chloride, methyl acrylate, methyl methacrylate, diallyl phthalate, vinyl allyl phthalate, divinyl adipate, chlorallyl acetate, and vinyl methallyl pimelate. Illustrative examples of these polymers include poly(allyl 2,3-epoxy-propyl ether), poly(2,3-epoxy-propyl crotonate), allyl 2,3-epoxy-propyl ether-styrene copolymer, methallyl 3,4-epoxy-butyl ether-allyl benzoate copolymer, poly(vinyl 2,3-epoxy-propyl ether), allyl glycidyl ether-vinyl acetate copolymer and poly(4-glycidyloxy-styrene).

These polymers are preferably prepared by heating the monomer or monomers in bulk or in the presence of an inert solvent, such as benzene in the presence of air or a peroxy catalyst, such as ditertiary-butyl peroxide, at temperatures ranging from 75° C. to 200° C.

The preparation of polymers of this type may be illustrated by the following example showing the preparation of poly(allyl glycidyl ether).

PREPARATION OF POLYMERS OF UNSATURATED GLYCIDYL ETHERS

Polyether D

About 100 parts of allyl glycidyl ether was heated at 155° C. in a glass flask and ditertbutyl peroxide added incrementally for 15 hours until 3% had been added. Excess monomer was removed, leaving 36 g. of polymer. The poly(allyl glycidyl ether) obtained as the resulting product had a molecular weight of about 481–542 and an epoxy value of 0.50 eq./100 g. and a viscosity of 15 poise.

Particularly preferred members of the above-described group comprise the polymers and copolymers of the 2-alkenyl glycidyl ethers having a molecular weight between 300 and 1000.

Of special interest are the non-aromatic polyepoxides containing no elements other than carbon, hydrogen, oxygen and chlorine.

The epoxy curing agent employed in the impregnating solution may be any alkaline, neutral or acidic which acts to effect cure of the polyepoxide to form an insoluble product. The epoxy curing agent is preferably neutral or alkaline. Examples of curing agents include, among others, alkalies like sodium or potassium hydroxides; alkali phenoxides like sodium phenoxide; carboxylic acids or anhydrides, such as formic acid, oxalic acid or phthalic anhydride; Friedel-Crafts metal halides like aluminum chloride, zinc chloride, ferric chloride or boron trifluoride as well as complexes thereof with ethers, acid anhydrides, ketones, diazonium salts, etc.; salts, such as zinc fluoborate, magnesium perchlorate and zinc fluosilicate; phosphoric acid and partial esters thereof including n-butyl ortho-phosphate, diethyl ortho-phosphate and hexethyl tetraphosphate; amino compounds, such as, for example, diethylene triamine, triethylene tetraamine, dicyandiamide, melamine, pyridine, cyclohexylamine, benzyldimethylamine, benzylamine, diethylaniline, triethanolamine, piperidine, tetramethyl piperazine, N,N-dibutyl-1,3-propane diamine, N,N-diethyl-1,3-propane diamine, 1,2-diamino-2-methylpropane, 2,3-diamino-2-methylbutane, 2,4-diamino-2-methylpentane, 2-diamino-2,6-dimethyloctane, dibutylamine, dioctylamine, dinonylamine, distearylamine, diallylamine, diolelylamine, dicyclohexylamine, methylethylamine, ethylcyclohexylamine, o-tolylnaphthylamine, pyrrolidine, 2-methylpyrrolidine, tetrahydropyridine, 2-methylpiperidine, 2,6-dimethylpiperidine, diaminopyridine, tetraethylene pentamine, metaphenylene diamine, and the like; and soluble adducts of amines and polyepoxides and their salts, such as described in U.S. 2,651,589 and U.S. 2,640,037.

Preferred curing agents include the alkaline or neutral materials and more preferably the amine, polyepoxide amine adducts or their neutral salts. Coming under special consideration are the mono- and polyamines, such as those of the formulae

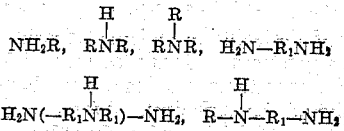

wherein R is a monovalent hydrocarbon radical and $R_1$ is a bivalent hydrocarbon radical containing no more than 18 carbon atoms and $n$ is an integer, preferably from 1 to 8. Particularly preferred are the aliphatic polyamines having a molecular weight below 250.

The above-noted polyepoxides and epoxy curing agent are applied to the fibrous material in the form of an aqueous medium. The medium may be a water solution or an aqueous emulsion or dispersion. The two components may be added as such directly to an aqueous medium or one or more of the components may be added separately in the form of an aqueous dispersion or emulsion. If the polyepoxide has limited solubility, it is usually preferred to add the material in the form of an aqueous emulsion.

Preferred emulsifying agents that may be utilized in the formation of the treating composition or in the preparation of emulsions of the various components include, among others, monooleate of sorbitan polyoxyethylene, the trioleate of sorbitan polyoxyethylene, sorbitan tristearate, sorbitan monolaurate, polyoxyethylene esters of alkyl phenols, carboxymethylcellulose, starch, gum arabic, polyvinyl alcohol, aryl and alkylated aryl sulfonates, such as cetyl sulfonate, oleylsulfonate, sulfonated mineral oils, copolymers of vinyl methyl ether, maleic anhydride, and the like, and mixtures thereof. The emulsifying agents are generally employed in amounts varying from 0.1% to 10% by weight and more preferably from .1% to 5% by weight.

The amount of the polyepoxide utilized in the aqueous medium may vary over a wide range. In general, the aqueous medium will contain from 1% to 20% and more preferably 2% to 15% by weight of the polyepoxide.

The amount of curing agent used may vary over a wide range depending on the particular type utilized. The amount of agent preferably varies from 0.5% to 20% by weight of the polyepoxide and more preferably from about 5% to 30% by weight of the polyepoxide. If the curing agent is an acid anhydride, it is preferably utilized in equivalent amounts, i.e., an anhydride group for every epoxy group.

The treating solution is preferably prepared by combining the components as indicated above and then stirring to effect thorough mixing. This may be accomplished by use of stirrers or by other mechanical means.

The application of the above solution to the synthetic fibrous materials may be effected in any suitable manner. It is generally preferred to apply the solution by simply dipping the fibrous material, loose or under tension, into the solution and running it through conventional-type padding rollers. The solution can also be applied by spraying, brushing or other conventional methods. If the desired amount of polyepoxide is not obtained in one application, the solution can be applied again or as many times as desired in order to bring the amount of polyepoxide to the desired level. Wet pickup per pass preferably varies from 10% to 80% and more preferably from 15% to 50%.

In order to obtain the desired adhesion, the amount of solids deposited on the fibrous material should be at least 0.1% by weight of the material, and preferably from 0.5% to 15% by weight of the material.

After the desired amount of solution has been applied, the treated fibrous material is preferably dried for a short period to remove some or all of the dispersing liquid, such as the water. This is preferably accomplished by maintaining the material at its original dimensions and exposing the framed product to elevated temperatures for a few minutes. Drying time will depend largely on the amount of pickup permitted during the application of the solution and the concentration of the solution. In most cases, drying periods of from 1 to 30 minutes at temperatures ranging from about 80° C. to 200° C. should be sufficient. Water content of the treated fibrous material is preferably reduced below 10% and more preferably below 5%. Drying may be accomplished by exposure to infra-red rays for a few seconds.

The fibrous material treated according to the above process is then treated in a second step with a liquid medium containing a rubber and preferably a rubber and a fusible condensate of an aldehyde and a member of the group consisting of phenols, ureas, melamines and ketones.

Unless otherwise indicated, the expression "rubber" as used herein refers to natural and synthetic rubber. Representative synthetic rubbery polymers include the "butadiene polymers." Butadiene polymers include those polymers having rubber-like properties which are prepared by polymerizing butadiene alone or with one or more other copolymerizable ethylenically unsaturated compounds, such as styrene, methyl methacrylate, 3,4-dichloroalpha-methyl styrene, methyl isopropenyl ketone, vinyl pyridine and acrylonitrile, the butadiene being present in the mixture preferably to the extent of at least 40% of the total polymerizable material. The butadiene-styrene copolymers are manufactured commercially under such names as GR–S 1000, GR–S 1500, GR–S 1600, GR–S 2000, GR–S 2101 and the like. These polymers can be prepared by either the "hot" or "cold" technique. The butadiene-acrylonitrile copolymer rubbers are manufactured under such names as "Buna N," "Hycar OR–10," "Perbunan" and "Chemigum."

Other synthetic rubbers include the neoprene rubbers. "Neoprene" is a generic name which is applied to polymers of chloroprene and copolymers of the chloroprene with dienes or vinyl compounds in which the chloroprene comprises the predominant monomer. These polymers and copolymers are usually made in aqueous emulsions and are available on the market under the names as GR–M, Neoprene Type GN, Neoprene Type E, Neoprene FR and the like.

Isobutylene rubbers, such as those known in industry as GR–1 rubbers, may also be used in the process of the invention.

The rubber materials are preferably natural and synthetic rubbers which are prepared from at least one compound selected from groups consisting of conjugated diolefins and chloroprene.

The other component of the liquid medium preferably used in the second treatment step may be any fusible soluble condensate of an aldehyde and a phenol, urea, melamine or ketone. The aldehydes used in preparing such condensates may be aliphatic, cycloaliphatic, or aromatic monoaldehyde, such as, for example, acetaldehyde, acrolein, benzaldehyde, cyclohexanal, and the like. Formaldehyde, and materials which engender formaldehyde, such as, for example, paraformaldehyde and trioxane, are the preferred materials to be used in most cases.

The phenols to be reacted with the aldehydes may be any mono- or polynuclear and monohydric or polyhydric phenols, such as, for example, phenol, bis-phenol-A, p-butyl phenol, p-octyl phenol, p-tertiary butyl phenol, p-tertiary amyl phenol, p-isooctyl phenol, o-phenyl phenol, p-dodecyl phenol, p-stearyl phenol, 3,5-xylenols, pentadecyl phenol, resorcinol, catechol, pyrogallol, hydroquinone, di(hydroxyphenyl) sulfide, 1,5-dihydroxynaphthalene, p-octyl catechol, p-pentyl resorcinol, 4-cyclohexyl 1,6 - anthracenediol, 2,2 - bis(4 - hydroxyphenol) pentane, and the like. Particularly preferred phenols to be employed are the polyhydric phenols and preferably resorcinol.

The amine and amide components that may be reacted with the aldehydes may be exemplified by urea, thiourea, various substituted ureas and thioureas, as ethylene urea, dicyandiamide, guanidine, melamine, 2,6-diamino-1,3-diazine, 5-methyl-2,6-diamino-1,3-diazine, 4-chloro-2,6-diamino-1,3-diazine, and mixtures thereof. Particularly preferred components of this group include urea, thiourea and melamine.

The ketone components that may be reacted with the aldehydes to form the fusible condensates include, among others, acetone, methyl ethyl ketone, dibutyl ketone, cyclohexanone, diethyl ketone, ethyl amyl ketone, and the like, and mixtures thereof. Acetone is particularly preferred.

The preparation of the fusible condensates of this type is fully illustrated in the art. The preparation of aldehyde-phenol condensates, for example, is described in U.S. 2,330,217 and in Carswell "Phenolplasts," 1947, page 29. The preparation of some of the condensates of aldehydes and amines or amides may be found in U.S. 2,704,750 and the preparation of ketone-aldehyde condensates may be found in 2,571,089 and 2,540,886.

The above-described rubber and rubber and aldehyde condensate combinations are applied to the fibrous materials in the form of a liquid medium. This medium may be an aqueous or solvent medium, but for practical applications it is preferably an aqueous medium. If water is employed, the components may be utilized in the form of a straight solution, dispersion, suspension or emulsion. If emulsion is desired, any suitable emulsifying agent, such as described hereinabove for the preparation of the polyepoxide emulsion may be utilized. When the aldehyde condensates are used, it is preferred to add the aldehyde condensate to the rubber latex and utilize this mixture to treat the textile material.

The total solids, i.e., rubber or rubber and aldehyde condensates, in the treating solution may vary from about 3% to about 50%, and more preferably from about 5% to 40%. When using the rubber-aldehyde condensate mixtures, the aldehyde condensate should preferably make up at least 5% by weight of the total solids, and more preferably from 10% to 40% by weight of the total solids. The rubber is preferably employed in amounts varying from 90% to 60% by weight of the total solids.

The treating solution containing the rubber or rubber and aldehyde condensates may be applied to the fibrous material in the same manner as described hereinabove for the application of the polyepoxide medium. In order to obtain the desired adhesion, the amount of the total solids deposited on the fibrous material should be at least 1% by weight of the material, and more preferably from 3% to 25% by weight of the material.

After the desired amount of solids has been applied to the fibrous material, the treated material is then dried in the same manner as described above for drying the fibrous material treated with the aqueous medium containing the polyepoxide. After drying, the treated fibrous material may then be treated with the rubber stock so as to form the desired reinforced product. Rubber used for this purpose may be any of those described above for the preparation of the treating solution. The rubber may be the same as that used in the treating solution or may be of a different kind or type.

The rubber stock applied will contain various additives, such as those needed to effect the vulcanization. Examples of these materials include, among others, sulfur, sulfur chloride, sulfur thiocyanate, thiuram polysulfides and other organic or inorganic polysulfides. These components are preferably employed in amounts varying from about 0.1 part to 10 parts per 100 parts of rubber and more preferably from .3 to 3 parts per 100 parts of rubber.

Vulcanization accelerators and accelerator activators may also be present, particularly when sulfur-containing compounds are employed as the vulcanizing agent. Illustrative examples of accelerators are tetramethyl thiuram disulfide, zinc dibutyl dithiocarbamate, tetramethyl thiuram monosulfide, dipentamethylene thiuram tetrasulfide, mercapto benzothiazole, hexamethylene-tetraamine, aldehyde-ammonia, diphenyl-guanidine, diphenylthiurea, benzothiazyl disulfide, piperidinium pentamethylene-dithiocarbamate, lead dimethyl-dithiocarbamate, and the like. Such materials are preferably employed in amounts varying from about .01% to about 5% by weight.

A great variety of other materials may be included in the composition, such as carbon blacks, such as furnace and channel blacks, pigments, anti-oxidants, anti-scorch agents, and the like.

Having compounded the rubber by mixing therewith as described above, the mix may then be vulcanized by heating the compounded stock to an elevated temperature, preferably above 100° C. for a short period. Preferred vulcanization treatments are those conducted at temperatures ranging from about 125° C. to 175° C. for from 15 to 60 minutes.

Compositions produced according to the present invention may be utilized for a wide variety of important industrial applications. They may be used, for example, in the preparation of automobile tires, transmission belts, conveyer belts, floor tiles, hoses, raincoats, luggage, and the like.

The process of the invention may be applied to the treatment of any fibrous material useful in the reinforcing of rubber products, such as cotton, rayon, etc. Preferred materials because of their strength and durability, however, are the synthetic fibers. Synthetic fibrous materials include, among others, regenerated cellulose, fibers prepared from acrylonitrile polymers, vinyl chloride polymers, vinylidene chloride polymers, vinylidene cyanide polymers, polyesters, polyamides, polyester-polyamides, cellulose ethers, cellulose esters, cellulose ether esters, and polymers prepared from corn protein (zein) and formaldehyde. The polymers of acrylonitrile, vinyl chloride, vinylidene chloride, and vinylidene cyanide referred to above include the homopolymers of these monomers as well as copolymers of the monomers with dissimilar monomers, particularly those containing at least one $CH_2=C<$ group, such as, for example, vinyl acetate, methacrylonitrile, allyl glycidyl ether, allyl alcohol, allyl mercaptan, methyl methacrylate, chlorostyrene, styrene, butadiene, methylpentadiene, methacrylamide, diallyl phthalate, vinyl methyl ether, allyl butyl ketone, ethylene glycol dimethacrylate, and the like, as well as the above monomers themselves when dissimilar to the basic monomer, such as vinyl chloride, acrylonitrile and vinylidene chloride. These copolymers preferably contain at least 15%, and more preferably from 20% to 95% of at least one of the basic monomers vinyl chloride, acrylonitrile, vinylidene chloride and vinylidene cyanide. Examples of these copolymers include Acrilan (85% acrylonitrile and 15% vinyl acetate), Dynel (60% vinyl chloride and 40% acrylonitrile) and Saran (85% vinylidene chloride and 15% vinyl chloride).

The polyesters used in preparing the synthetic fibrous materials are preferably those high molecular weight products obtained by reacting glycols, such as ethylene glycol, propylene glycol, and the like, with polycarboxylic acids, such as, for example, terephthalic acid, isophthalic acid, adipic acid, succinic acid, stilbenedicarboxylic acid, and the like. The polyamides are preferably those high molecular weight products obtained by reacting polyamines, and particularly the alpha,omega-diamines, such as 1,6-hexamethylene diamine, 1,5-pentamethylene diamine and 1,8-octamethylene diamine, with polycarboxylic acids, such as adipic acid, succinic acid, phthalic acid, chlorophthalic acid and the like. The polyamides may also be prepared by polymerization of aminocarboxylic acids, such as aminocaproic acid. The polyester-polyamides are preferably those high molecular weight products obtained by reacting polycarboxylic acids as described above with amino alcohols, such as 4-aminobutanol, 5-aminohexanol, 6-aminooctanol and the like. The cellulose derivatives are preferably the alkanoic acid esters of cellulose, such as cellulose acetate and cellulose butyrate.

Other synthetic fibrous materials include those prepared from polyvinyl alcohol or vinyl alcohol copolymers polyethylenes, polyurethanes (Perluran), mineral fibers (Fiberglas) and alginic materials as alginate rayon.

The synthetic fibrous material may be in the form of threads, cords, yarn, woven fabric or in any other form suitable for use in making reinforced rubber products.

Preferred fibrous material to be used, particularly if it is to be used in making tires is rayon made by viscose process and having a high dry tensile strength of 2.0 grams or more per denier. Nylon tire cord is also preferred.

To illustrate the manner in which the invention may be carried out, the following examples are given. It is to be understood, however, that the examples are for the purpose of illustration and the invention is not to be regarded as limited to any of the specific conditions cited therein. Unless otherwise indicated, parts described in the examples are parts by weight.

The resorcinol-aldehyde condensate used in the following examples was prepared by dissolving 0.3 part NaOH, 11 parts resorcinol and 16.2 parts of 37% formaldehyde in 238.4 parts water. After solution is effected, the reaction is carried out for 6 hours at 75–78° F.

Example I

This example illustrates the superior adhesion obtained by treating nylon tire cord with an aqueous medium containing Polyether A and then with an aqueous medium containing a resorcinol-formaldehyde resin and a butadiene-vinyl pyridine rubber.

100 parts of Polyether A and 100 parts of a 10% aqueous solution of an 85% hydrolyzed polyvinyl acetate were stirred together and additional water added to bring the solution up to a 15% Polyether A solution. 25 parts of ethylene diamine were added to the solution with stirring.

Nylon tire cord (1900 denier 2 ply) was then treated with the above mixture by means of a Butterworth 3-roll Laboratory Padder. The cord after padding showed a 30% wet pickup with a 4.5% resin pickup. The treated cord was stretched to original dimension on a frame and dried at 143° C. for 5 minutes.

The treated cord was then padded with an aqueous medium containing 20% by weight of a mixture of resorcinol-formaldehyde resin and vinyl pyridine-butadiene rubber (Gen-Tac). This aqueous mixture was prepared by adding 244.0 parts of 41% vinyl pyridine-butadiene rubber latex to 266 parts of a 6.4% resorcinol-formaldehyde resin solution and 61 parts of water. After padding, the treated cord showed a 25% wet pickup. The cord treated in this manner was then stretched to original dimension and dried at 143° C. for 5 minutes.

The nylon cord treated by the above two step process was then molded for 30 minutes at 145° C. into an H block specimen using the following recipe:

| | Parts |
|---|---|
| Smoked natural rubber | 65 |
| Whole tire reclaimed rubber | 45 |
| Stearic acid | 2.13 |
| Pelletex | 17.76 |
| Sterling Smoothout | 8.88 |
| Pine tar | 3.91 |
| Anti-oxidant | 1.07 |
| ZNO | 3.46 |
| MBTS (accelerator) | .6 |
| Thionex | .21 |
| Sulfur | 2.76 |

The specimen was then removed from the mold, cooled and the adhesion of the cord to rubber determined by measuring strength needed to separate the cord from the rubber. The H specimen prepared from cord treated in the above-described manner had a strength of 30.2 lbs. as compared to a value of 15.4 for a specimen containing nylon cord treated only with the mixture of resorcinol-aldehyde resin and butadiene-vinyl pyridine polymer.

The specimen containing the cord treated according to the above-noted two step process was also exposed to high temperatures and considerable stretching and flexing but still displayed good adhesion of rubber to cord. For example, the specimen when heated at 100° C. for 1 hour, still possessed an adhesion value of 21.5 as compared to a value of 11.5 for specimen containing the cord treated only with the mixture of resorcinol-formaldehyde resin and vinyl pyridine-butadiene polymer.

Example II

Example I was repeated with the exception that the two step process was applied to rayon tire cord (1650 denier 2 ply) instead of to nylon tire cord. The rubber specimen prepared from the cord treated as in Example I had an adhesion value of 30.0 as compared to the value of 20 for a similar rubber specimen prepared from rayon cord treated only with the mixture of resorcinol-aldehyde resin and vinyl pyridine-butadiene polymer.

Example III

Example I was repeated with the exception that the two step process was applied to rayon tire cord and the curing agent was a soluble adduct of Polyether D and diethylene triamine stripped of excess diethylene triamine and neutralized with acetic acid to pH of 9.5. The rubber specimen prepared from the cord treated in this manner had an adhesion value of 32.3 as compared to the control of 20.

Example IV

This example illustrates the superior adhesion obtained by treating nylon tire cord with an aqueous medium containing Polyether D and then with an aqueous medium containing a resorcinol-formaldehyde resin and a vinyl pyridine-butadiene rubber.

100 parts of Polyether D and 100 parts of a 10% aqueous solution of an 85% hydrolyzed polyvinyl acetate were stirred together and additional water added to bring the solution up to a 15% Polyether D solution. 25 parts of ethylene diamine were added to the solution with stirring.

Nylon tire cord was then treated with the above mixture by means of the Butterworth 3-roll Laboratory Padder. The cord after padding showed a 25% wet pickup. The treated cord was stretched to original dimension on a frame and dried at 143° C. for 5 minutes.

The treated cord was then padded with an aqueous medium containing 20% by weight of a mixture of resorcinol-formaldehyde resin and a vinyl pyridine-butadiene rubber (70-butadiene-30 vinyl pyridine). This mixture was prepared as shown in Example I. After padding, the treated cord showed a 25% wet pickup. The cord was then stretched to original dimension and dried at 143° C. for 5 minutes.

The nylon cord treated by the above two step process was then molded into an H block specimen using natural rubber stock as shown in Example I. The H specimen prepared in this manner had a strength of 30.7 as compared to a value of 15.4 for a specimen containing nylon cord treated only with the mixture of resorcinol-aldehyde resin and vinyl pyridine-butadiene polymer.

The specimen containing the cord treated according to the above-noted two step process was also exposed to high temperatures and considerable stretching and flexing but still displayed good adhesion of rubber to cord. For example, the specimen when heated at 100° C. for 1 hour, still possessed an adhesion value of 22 as compared to a value of 11.5 for the specimen containing cord treated only with the mixture of resorcinol-formaldehyde resin and vinyl pyridine polymer.

Example V

This example illustrates the superior adhesion obtained by treating rayon tire cord with an aqueous medium containing Polyether D and then with an aqueous medium containing a resorcinol-formaldehyde resin and a vinyl pyridine-butadiene rubber.

100 parts of Polyether D and 100 parts of a 10% aqueous solution of an 85% hydrolyzed polyvinyl acetate were stirred together and additional water added to bring the solution up to a 15% Polyether D solution. 25 parts of an adduct of Polyether C and diethylene triamine stripped to remove excess diethylene triamine and neutralized with acetic acid to pH 9.5 were added to this mixture as the curing agent.

Rayon tire cord was then treated with the above mixture by means of the Butterworth 3-roll Laboratory Padder. The cord after padding showed a 25% wet pickup. The treated cord was stretched to original dimension on a frame and dried at 143° C. for 5 minutes.

The treated cord was then padded with an aqueous medium containing 20% by weight of a mixture of resorcinol-formaldehyde resin and vinyl pyridine-butadiene copolymer. This mixture was prepared as shown in Example I. After padding, the treated cord showed a 25% wet pickup. The cord was then stretched to original dimension and dried at 143° C. for 5 minutes.

The nylon cord treated by the above two step process was then molded into an H block specimen using natural rubber stock as shown in Example I. The H specimen prepared in this manner had a strength of 30.8 compared to a value of 20 for a specimen prepared from rayon cord treated only with the mixture of resorcinol-formaldehyde resin and vinyl pyridine-butadiene copolymer. The specimen prepared from the cord treated according to the above-noted two step process still possessed excellent adhesion even after being exposed to high temperatures and considerable stretching and flexing.

Related results are obtained by replacing the Polyether D triethylene diamine curing agent with equal amounts of each of the following: di(aminocyclohexylmethyl amine), triethylene tetraamine and hexamethylene diamine.

*Example VI*

This example illustrates the superior adhesion obtained by treating nylon tire cord with an aqueous medium containing Polyether C and then with an aqueous medium containing a resorcinol-formaldehyde resin and a vinyl pyridine-butadiene rubber.

An emulsion was prepared by adding 74 parts of Polyether C to 6.4 parts of a polyethylene glycol ether of sorbitan monopalmitate at 100° C. and then adding 64 parts of a 5% solution of 85% hydrolyzed polyvinyl acetate. 25 parts of ethylene diamine were added to the emulsion and water added to make the solution 15% Polyether C solution.

Rayon tire cord was then treated with the above mixture as shown in the preceding example. The dried cord was then padded with an aqueous medium containing 20% by weight of a mixture of resorcinol-formaldehyde resin and vinyl pyridine-butadiene rubber as prepared in Example I. This cord was dried at 143° C. for 5 minutes, and then the cord was used to make an H block specimen using natural rubber as shown in the preceding example. The specimen prepared in this manner had a strength of 29.5 as compared to a value of 15.4 for the specimen prepared from cord treated only with the mixture of resorcinol-formaldehyde and vinyl pyridine-butadiene rubber.

*Example VII*

Example VI was repeated with the exception that the two step process was applied to rayon tire cord instead of nylon cord. The rubber specimen prepared from the cord treated as in Example VI had an adhesion value of 28.0 as compared to 20 for the specimen containing the cord treated only with the mixture of resorcinol-formaldehyde and vinyl pyridine-butadiene rubber.

*Example VIII*

This example illustrates the superior adhesion obtained by treating nylon tire cord with an aqueous medium containing Polyether A and then with an aqueous medium containing a resorcinol-formaldehyde resin and a butadiene-styrene rubber.

Nylon tire cord was treated with a 15% aqueous solution of Polyether A and Polyether C diethylene triamine adduct as curing agent as shown in Example III. The cord after drying was then padded with an aqueous solution containing 20% by weight of a mixture of resorcinol-formaldehyde resin and GR-S 2000 (44-48%-styrene-56-52% butadiene) latex. This mixture was prepared by adding 86 parts of the 40% GR-S 2000 latex to 92 parts of a 6.4% resorcinol-formaldehyde resin solution (prepared as shown above) and 20 parts of water. After padding, the treated cord showed a 25% wet pickup. The cord treated in this manner was then stretched to original dimension and dried at 143° C. for 5 minutes.

The nylon cord treated by the above two step process was then molded for 30 minutes at 145° C. into an H block specimen using rubber stock as shown in Example I. The H specimen prepared from the cord treated as above had an adhesion value of 29.3 as compared to 15.4 for the control.

*Example IX*

Example VIII was repeated with the exception that the two step process was applied to rayon tire cord instead of nylon. The rubber specimen prepared from the cord treated as in Example VIII had an adhesion of 31.3 as compared to the adhesion value for the control of 20.

*Example X*

Example IX was repeated with the exception that the curing agent was ethylene diamine in the first step of the two step process. The rubber specimen prepared from the cord treated in this manner had an adhesion of 29.5 as compared to a value of 20 for the control.

*Example XI*

Example VIII was repeated on nylon cord with the exception that the curing agent was di(aminocyclohexylmethyl amine). The rubber specimen prepared from the cord treated in this manner had an adhesion of 27.0 as compared to a value of 15.4 for the control.

*Example XII*

This example illustrates the superior adhesion obtained by treating nylon tire cord with an aqueous medium containing Polyether D and then with an aqueous medium containing a resorcinol-formaldehyde resin and a butadiene-styrene rubber.

Nylon tire cord was treated with a 15% aqueous solution of Polyether D and the Polyether C diethylene triamine adduct described as in Example III as the curing agent. The cord after drying was then padded with an aqueous solution containing 20% by weight of a mixture of resorcinol-formaldehyde resin and GR-S 2000 as described in Example VIII. After drying, the cord was then molded for 30 minutes at 145° C. into an H block specimen using natural rubber stock as shown in Example I. The H specimen prepared from the cord treated in this manner had an adhesion of 29.0 as compared to 15.4 for the control.

Related results are obtained by replacing the GR-S 2000 latex in the second step of the treating process with equal amounts of each of the following: natural rubber latex containing 30% solids, GR-S 2101 (21-24.4%-styrene, 79-74.5%-butadiene) and neoprene latex.

*Example XIII*

Example XII was repeated using ethylene diamine as the curing agent in the first step. In this case, the rubber specimen had an adhesion value of 28.0 as compared to 15.4 for the control.

*Example XIV*

Example XII was repeated on rayon using ethylene diamine as the curing agent in the first step. In this case, the rubber specimen had an adhesion value of 28.0 as compared to 20 for the control.

*Example XV*

This example illustrates the superior adhesion obtained by treated Dacron tire cord with an aqueous medium containing Polyether B and then with an aqueous medium containing a melamine-formaldehyde resin and a vinyl pyridine-butadiene rubber.

100 parts of Polyether B and 100 parts of a 10% aqueous solution of an 85% hydrolyzed polyvinyl acetate were stirred together and additional water added to bring the solution up to a 15% Polyether B solution. 25 parts of ethylene diamine were added as curing agent.

Dacron tire cord was then treated with the above mixture. The cord after padding showed a 25% wet pickup. The cord was stretched and dried at 143° C. for 5 minutes.

The treated cord was then padded with an aqueous medium containing 20% by weight of a mixture of melamine-formaldehyde resin and a vinyl pyridine-butadiene polymer. This aqueous mixture was prepared by adding 244.0 parts of 41% vinyl pyridine-butadiene copolymer latex to 260 parts of a 6.0% melamine-formaldehyde resin solution and additional water to make up to 20% solution. After padding, the cord was dried at 95° C.

The Dacron cord treated by the above two step process was then molded for 30 minutes at 145° C. into an H block specimen using a butadiene-styrene copolymer rubber and conditions as shown in Example I. The specimen prepared in this manner had excellent adhesion as compared to the control and retained the adhesion even after exposure to high temperatures and considerable flexing and stretching.

Related products are obtained by replacing the Dacron cord with the following: Orlon cord, cotton cord, cellulose acetate cord and Vinyon cord.

*Example XVI*

Nylon tire cord was treated with a 5% aqueous solution of Polyether C and ethylene diamine which was obtained by mixing 100 parts of Polyether C and 50 parts of ethylene diamine in the required amount of water. The cord after drying at 143° C. for 5 minutes was then padded with an aqueous solution containing 20% by weight of a mixture of resorcinol-formaldehyde resin and a vinyl pyridine-butadiene copolymer (65%-butadiene, 35%-vinyl pyridine) prepared as noted above. After padding, the treated cord showed a 25% wet pickup. The cord was then dried at 143° C. for 5 minutes.

The nylon cord treated by the above two step process was then molded for 30 minutes at 145° C. into an H block specimen using rubber stock as in Example I. The H specimen prepared from the cord treated as above had an adhesion value of 28.8.

*Example XVII*

Rayon tire cord was treated with a 15% aqueous solution of Polyether A and ethylene diamine which was prepared as shown in Example I. The cord after drying at 143° C. for 5 minutes was then padded with an aqueous solution containing 20% by weight of a GR-S 2000 rubber. After padding, the treated cord showed a 25% wet pickup. The cord was then dried at 143° C. for 5 minutes.

The rayon cord treated as above was then molded into an H block specimen as in Example I. The specimen prepared in this manner had an adhesion value of 29.5.

*Example XVIII*

Nylon tire cord was treated with a 15% aqueous solution of Polyether D and an adduct of Polyether C and diethylene triamine which was prepared as in Example V. The cord after drying at 143° C. was then padded with an aqueous solution containing 20% by weight of a vinyl pyridine-butadiene copolymer (65%-butadiene, 35%-vinyl pyridine). After padding, the cord was dried at 143° C. for 5 minutes.

The nylon tire cord treated as above was then molded into an H block specimen as in Example I. The specimen prepared in this manner had an adhesion value of 27.

*Example XIX*

Nylon tire cord was treated with a 10% aqueous solution of Polyether A and benzyl dimethyl amine which was obtained by mixing 100 parts of Polyether A and 50 parts of benzyl dimethyl amine in the required amount of water. The cord after drying at 143° C. was then padded with an aqueous solution containing 20% by weight of a mixture of acetone-formaldehyde condensate (5%) and a 40-butadiene/60-acrylonitrile copolymer (95%). After padding, the treated cord showed a 25% wet pickup. The cord was then dried at 143° C. for 5 minutes.

The nylon cord treated by the above two step process was then molded for 30 minutes at 145° C. into an H block specimen using GR-S 1500 (23.5% bound styrene) as rubber stock, 20 parts carbon black, 2 parts sulfur, 4 parts pine tar, 1 part anti-oxidant, 0.6 part Altax, 0.2 part Thionex, 4 parts zinc oxide and 2 parts stearic acid. The H specimen prepared in this manner had excellent adhesion strength even after being exposed to relative high temperatures and considerable flexing and stretching.

Related results are obtained by replacing the GR-S 1500 in the above process with each of the following: natural rubber latex, GR-S 2101 (21–24%-styrene, 79–76%-butadiene) and neoprene latex.

I claim as my invention:

1. A process for treating fibrous material to improve their ability to adhere to rubber which comprises padding the fibrous material with an aqueous medium containing a polyepoxide having an epoxy equivalency per 100 grams greater than 0.20 and an epoxy curing agent, drying the treated fibrous material and then padding the resulting fibrous material with a liquid medium containing a rubber.

2. A process for treating synthetic fibrous material to improve their ability to adhere to rubber which comprises impregnating the fibrous material with an aqueous medium containing an aliphatic polyepoxide having an epoxy equivalency per 100 grams greater than 0.20 and a molecular weight below 1000, an epoxy curing agent, drying the treated material and then impregnating the fibrous material with a liquid medium containing a vulcanizable rubber and a fusible condensate of an aldehyde and a member of the group consisting of phenols, ureas, melamines and ketones.

3. A process as in claim 2 wherein the aldehyde condensate is a resorcinol-formaldehyde resin.

4. A process as in claim 2 wherein the rubber is a vinyl pyridine-diolefin copolymer.

5. A process as in claim 2 wherein the fibrous material is nylon cord.

6. A process as in claim 2 wherein the fibrous material is rayon cord.

7. A process as in claim 2 wherein the epoxy curing agent is an aliphatic polyamine having a molecular weight below about 250.

8. A process as in claim 2 wherein the polyepoxide is a halogen-containing polyether polyepoxide composition which composition is a mixture of ethers of polyhydric alcohols, the polyhydric alcohols having from 2 to 5 hydroxyl groups with at least two of the hydroxyl groups replaced in part by the group

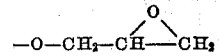

and in part by the group

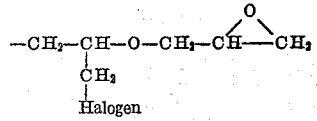

and any hydroxyl groups which are not so replaced being unchanged hydroxyl groups.

9. A process as in claim 2 wherein the polyepoxide is a glycidyl ether of glycerol.

10. A process for preparing a composite product wherein fibrous material and rubber are combined in adhering relationship which comprises padding fibrous material with an aqueous medium containing a polyepoxide having an epoxy equivalency per 100 grams greater than 0.20, an epoxy curing agent, drying the treated fibrous material then padding the resulting fibrous material with a liquid medium containing a rubber, drying the treated material, and then applying rubber stock to the so treated fibrous material and vulcanizing the product.

11. A process as in claim 10 wherein the rubber to be vulcanized with the treated fibrous material is a rubbery polymer of at least one component selected from the group consisting of conjugated diolefins and chloroprene.

12. A process as in claim 10 wherein the rubber to be vulcanized with the treated fibrous material is a copolymer of butadiene and styrene.

References Cited in the file of this patent

UNITED STATES PATENTS

| | | |
|---|---|---|
| 2,314,996 | Lessig et al. | Mar. 30, 1943 |
| 2,354,426 | Briant | July 25, 1944 |
| 2,373,613 | Szegvari | Apr. 10, 1945 |
| 2,439,514 | Herndon | Apr. 13, 1948 |
| 2,555,169 | Voorthuis | May 29, 1951 |
| 2,561,215 | Mighton | July 17, 1951 |
| 2,570,895 | Wilson | Oct. 9, 1951 |
| 2,581,464 | Zech | Jan. 8, 1952 |
| 2,615,008 | Greenlee | Oct. 21, 1952 |
| 2,706,166 | Gurney | Apr. 12, 1955 |

FOREIGN PATENTS

| | | |
|---|---|---|
| 513,647 | Canada | June 14, 1955 |